United States Patent Office 2,847,443
Patented Aug. 12, 1958

2,847,443

PENTAERYTHRITOL PRODUCTS

Ingenuin Hechenbleikner, Clarksburg, and Francis C. Lanoue, North Adams, Mass., assignors to Shea Chemical Corporation, Jeffersonville and Columbia, Ind., a corporation of Maryland No Drawing. Application May 2, 1956
Serial No. 582,075

8 Claims. (Cl. 260—461)

This invention relates to novel pentaerythritol type phosphites and to vinyl and vinylidene resins stabilized with such phosphites.

It is an object of the present invention to prepare new phosphites of pentaerythritol, dipentaerythritol and tripentaerythritol.

It is another object of the invention to prepare halogen containing vinyl and vinylidene resin compositions showing improved resistance to discoloration on exposure to the action of heat or light.

A further object is the development of new gasoline additives which will prevent preignition.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished by the preparation of novel mixed phosphites of (1) pentaerythritol, dipentaerythritol and tripentaerythritol and (2) various phenols.

In some instances it is possible to prepare the novel phosphite by reacting the appropriate diaromatic monochlorophosphite with pentaerythritol or its dimer or trimer or by reacting the appropriate aromatic dichlorophosphite with the pentaerythritol or its dimer or trimer.

However, the much preferred procedure is by partial trans-esterification of a tertiary aromatic phosphite having the formula

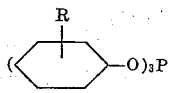

where R is selected from the group consisting of hydrogen, hydrocarbon and halogen with pentaerythritol, dipentaerythritol or tripentaerythritol.

The products of the present invention prepared from pentaerythritol have the formulae:

(a)

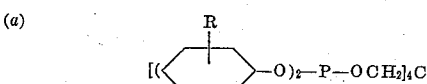

(b)

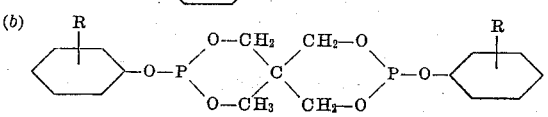

and (c)

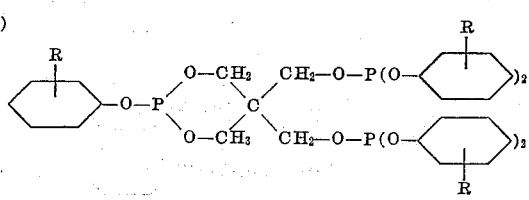

Products of group (a) above are made from 4 mols of the tertiary aromatic phosphite for each mol of pentaerythritol. Products of group (b) above are made from 2 mols of the tertiary aromatic phosphite for each mol of the pentaerythritol. Products of group (c) above are made from 3 mols of the tertiary aromatic phosphite for each mol of the pentaerythritol. In order to make substantially pure products these mol ratios should not be varied from to any great extent. The products from dipentaerythritol are made by using 6 mols of the tertiary aromatic phosphite per mol of dipentaerythritol and the products from tripentaerythritol are made from 8 mols of the tertiary aromatic phosphite per mol of tripentaerythritol.

All of the new compounds have been found to have a variety of uses. Thus, they can be used as heat and light stabilizers for halogen containing vinyl and vinylidene resins, as set forth below. The gasoline soluble cyclic compounds are useful as gasoline additives to react with the tetraethyl lead present to form lead phosphate and prevent preignition.

The new compounds are also useful as antioxidants for lubricating oils, natural rubber, synthetic rubber, such as butadiene-styrene copolymer, etc.

As the starting phosphites there can be employed triphenyl phosphite, tri-4-chlorophenyl phosphite; tri-2-chlorophenyl phosphite; tri-3-chlorophenyl phosphite; tri-2-methylphenyl phosphite; tri-3-methylphenyl phosphite; tri-4-methylphenyl phosphite; the trimethylphenyl phosphite made by using a commercial meta-paracresol mixture as the starting material; tri-2-bromophenyl phosphite; tri-4-tert. butylphenyl phosphite; tri-2-tert. butylphenyl phosphite; tri-4-n-butylphenyl phosphite, tri-4-n-octylphenyl phosphite, tri-2-cyclohexylphenyl phosphite; 2,4-dimethylphenyl phosphite.

The preferred starting materials are triphenyl phosphite and pentaerythritol. As typical examples of the new products made from pentaerythritol there may be mentioned:

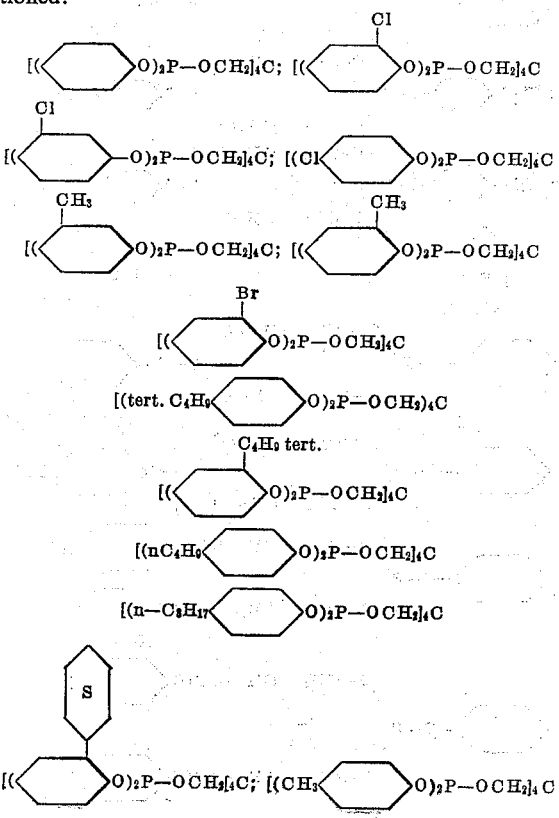

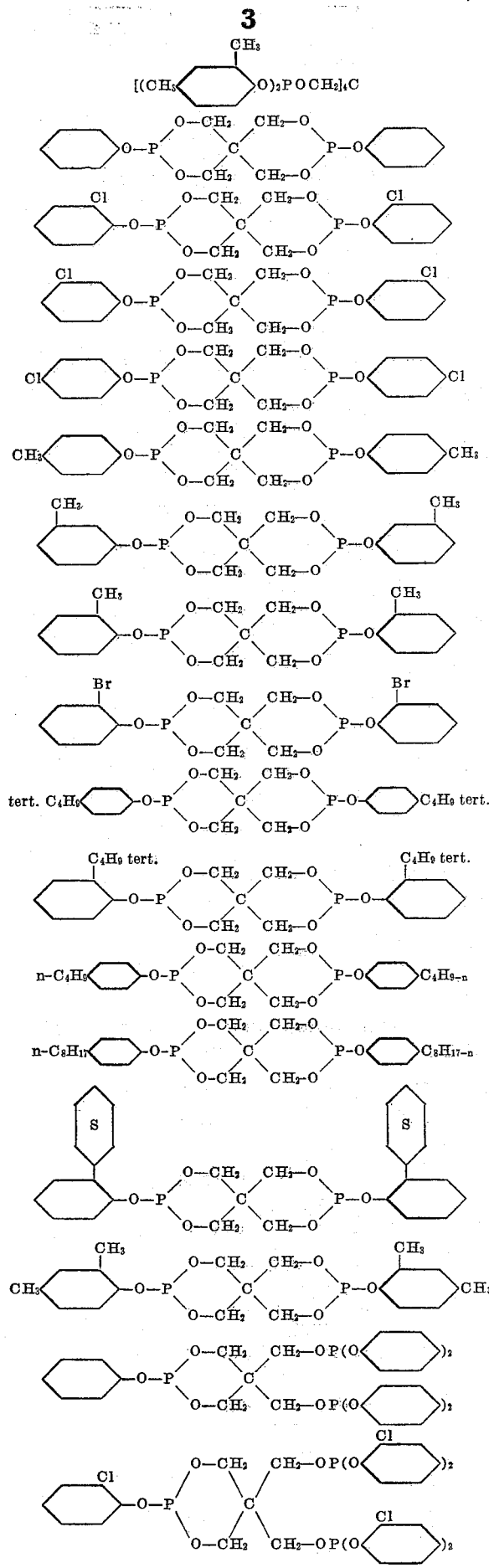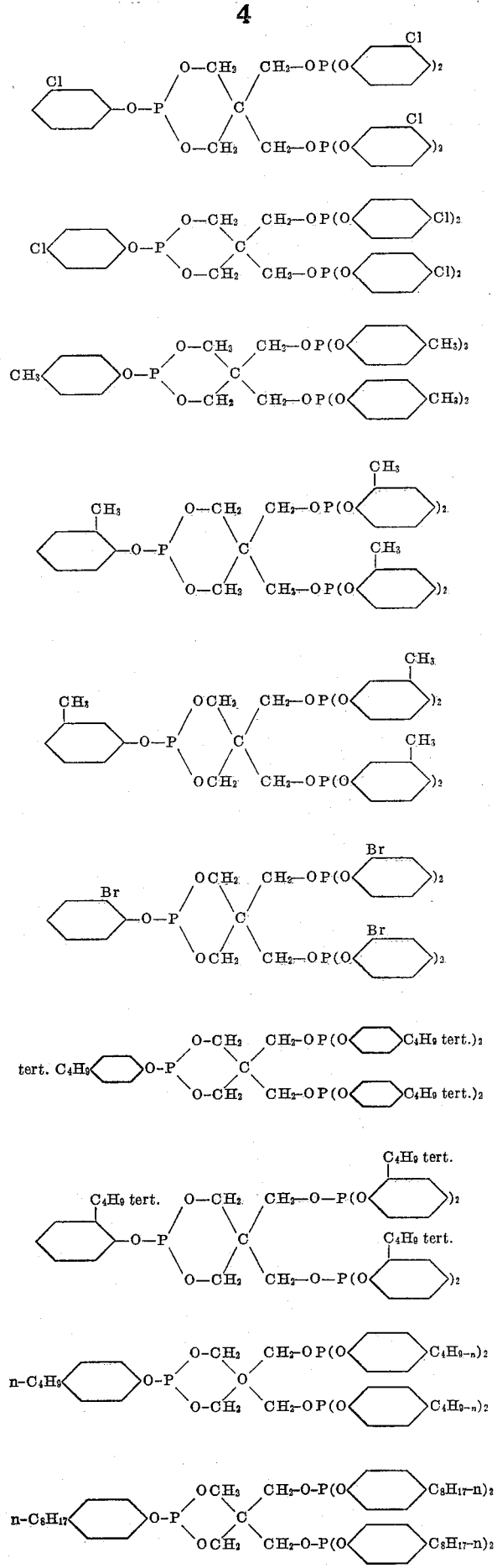

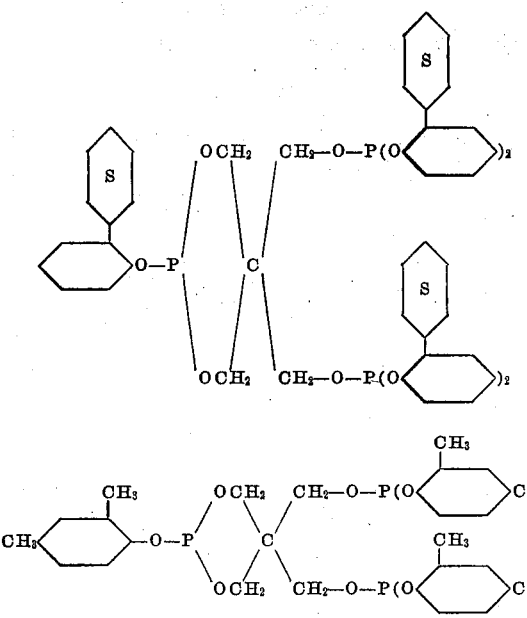

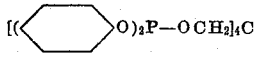

Typical examples of the products from dipentaerythritol are made by partial transesterification of one mol of dipentaerythritol with 6 mols of one of the following compounds: triphenyl phosphite; tri m-chlorophenyl phosphite; tri-p-chlorophenyl phosphite; tri-o-chlorophenyl phosphite; tri-o-methylphenyl phosphite; tri-m-methylphenyl phosphite; tri-p-methylphenyl phosphite; tri-o-bromophenyl phosphite; tri-p-tert. butylphenyl phosphite; tri-o-tert. butylphenyl phosphite; tri-p-n-butylphenyl phosphite; tri-p-n-octylphenyl phosphite; tri-o-cyclohexylphenyl phosphite; tri-o-p-dimethylphenyl phosphite.

Typical examples of the products from tripentaerythritol are made by partial transesterification of one mol of tripentaerythritol with 8 mols of triphenyl phosphite or 8 mols of triphenyl phosphite or 8 mols of any one of the other triaromatic phosphites previously mentioned as suitable for forming the novel products with dipentaerythritol.

The reaction between the tertiary aromatic phosphite and the pentaerythritol dipentaerythritol or tripentaerythritol can be carried out at widely varying temperatures, e. g., from room temperature to 100° C. or even reflux temperature in many instances. There is no need to use a catalyst although it is desirable to use a basic catalyst soluble in the reaction medium, particularly when lower temperatures, such as 20° C., for example, are employed. Typical catalysts are sodium phenate, trialkyl amines, e. g., triethyl amine, pyridine, etc. When a catalyst is employed, it is preferably used in a small amount, e. g., 0.01 mol per mol of the pentaerythritol or dipentaerythritol or tripentaerythritol.

Example 1

One mol of pentaerythritol, 4 mols of triphenyl phosphite and 0.01 mol of sodium phenate were allowed to stand together at room temperature and atmospheric pressure for half an hour and then the mixture was heated to 120° C. at 10 mm. pressure until the phenol formed all distilled. The yield of phenol was substantially quantitative for removal of one of the phenyl groups from the triphenyl phosphite. The residue was the desired with a melting point of 20° C.; $N_d^{25}$ 1.58100; $D_4^{25}$ 1.2100. The product was soluble in acetone, ether, toluene, benzene, glycol and most common solvents, except water and aliphatic hydrocarbons.

Example 2

Example 1 was repeated without the use of the sodium phenate catalyst with substantially the same results.

Example 3

Example 1 was repeated using one mol of pentaerythritol and two mols of the triphenyl phosphite. The product obtained in quantitative yields was

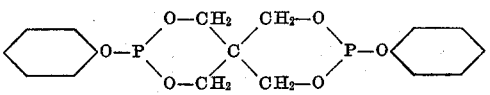

This compound was insoluble in water but soluble in hot hexane and other aliphatic hydrocarbons. It has a melting point of 123° C.

Example 4

Example 1 was repeated using one mol of pentaerythritol and three mols of the triphenyl phosphite. The product obtained in quantitative yields has the formula

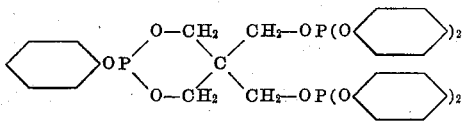

Example 5

Example 1 was repeated using one mol of dipentaerythritol and 6 mols of triphenyl phosphite to obtain a product which analyzed for $C_{82}H_{76}O_{19}P_6$ (the partial trans-esterification product resulting from complete reaction without an excess of the triphenyl phosphite or the dipentaerythritol being left over).

Example 6

Example 1 was repeated using one mol of tripentaerythritol and 8 mols of triphenyl phosphite to obtain a product which analyzed for $C_{111}H_{104}O_{26}P_8$ (the partial trans-esterification product resulting from complete reaction without an excess of the triphenyl phosphite or the tripentaerythritol being left over).

Any of the other pentaerythritol, dipentaerythritol or tripentaerythritol phosphites set forth above can be prepared as set forth in Examples 1–6 by replacing the triphenyl phosphite by the appropriate other aromatic phosphite.

The new phosphites prepared as described above, i. e., the phosphites obtained by partial trans-esterification of the tertiary aromatic phosphites with pentaerythritol, dipentaerythritol or tripentaerythritol have been found to be useful as heat and light stabilizers for halogen containing vinyl and vinylidene resins in which the halogen is attached directly to the carbon atoms in the polymer chain. Preferably the resin is a vinyl halide resin, specifically a vinyl chloride resin. Usually the vinyl chloride resin is made from monomers consisting of vinyl chloride alone or a mixture of monomers comprising at least 70% vinyl chloride by weight. The phosphite stabilizer is normally used in an amount of 0.05 to 20 parts per 100 parts of the vinyl chloride resin and preferably in an amount between 0.5 and 10 parts per 100 parts of resin.

As the chlorinated resin there can be employed chlorinated polyethylene having about 14 to about 75%, e. g., 27% chlorine, by weight, polyvinyl chloride, polyvinylidene chloride, polyvinyl bromide, polyvinyl fluoride, copolymers of vinyl chloride with 1 to 30% by weight copolymerizable materials such as vinyl acetate, vinylidene chloride, diethyl fumarate, diethyl maleate and other alkyl fumarates and maleates, vinyl propionate, methyl acrylate, ethyl acrylate, butyl acrylate and other alkyl acrylates, methyl methacrylate, ethyl methacrylate, butyl methacrylate and other methacrylates, methyl alpha chloroacrylate, styrene trichloroethylene, etc. Typical copolymers include vinyl chloride-vinyl acetate (95:5 weight ratio), vinyl chloride-vinyl acetate (87:13 weight ratio), vinyl chloride-vinyl acetate-maleic anhydride (86:13:1 weight ratio), vinyl chloride-vinylidene chloride (95:5 weight ratio), vinyl chloride-diethyl fumarate (95:5 weight ratio), vinyl chloride-trichloroethylene (95:5 weight ratio).

The vinyl and vinylidene polymers employed and copolymers can be formed by any of the conventional processes. Suitable methods include aqueous emulsion polymerization, as well as organic solvent polymerization, etc.

The stabilizers of the present invention can be incorporated with the resins in conventional manner. Thus, they can be mixed together with or without a volatile solvent such as acetone and the resulting mixture milled on rolls at 100 to 160° C. until it is completely homogenized. To prevent discoloration due to heat it is preferable to mix the resin and stabilizer thoroughly before heating. The stabilized resin is removed from the mill in the form of a sheet and can be used as such.

In addition to the novel stabilizer there can also be incorporated with the resin plasticizers, pigments, fillers and other conventional additives, either prior to or during the milling operation. If a plasticizer is employed, it is used in conventional amount, e. g., 40 to 150 parts per 100 parts of resin. Typical plasticizers are di-2-ethylhexyl phthalate, dibutyl sebacate, dioctyl sebacate, tricresyl phosphate, etc.

*Example 7*

100 parts by weight of polyvinyl chloride, 40 parts by weight dioctyl sebacate and 5 parts by weight of $$[(C_6H_5O)_2P-OCH_2]_4C$$

were thoroughly mixed and then homogenized by working on a roll mill heated at 145° C. for 3 minutes. The composition thus produced was removed in the form of a colorless sheet. This sheet proved resistant to color changes, e. g., on exposure to sunlight or upon being subjected to 160° C. for 5 minutes. Without the phosphite a control sample seriously discolored under these testing conditions.

*Example 8*

100 parts of a copolymer of 85% by weight vinyl chloride and 15% of vinyl acetate was similarly mixed and homogenized with 5 parts by weight of the phosphite used in Example 7 on the roll mill heated to 150° C. for 3 minutes. The resulting sheet was resistant to discoloration upon subsequent heating to 160° C. for 5 minutes.

*Example 9*

Example 7 was repeated replacing the $$[(C_6H_5O)_2POCH_2]_4C$$

by the same amount of

[structure: bis(phenoxy)phosphite pentaerythritol diester]

*Example 10*

Example 7 was repeated replacing the $$[(C_6H_5O)_2POCH_2]_4C$$

by the same amount of the pentaerythritol phosphite prepared in Example 4.

*Example 11*

Example 7 was repeated replacing the $$[(C_6H_5O)_2POCH_2]_4C$$

by the same amount of the dipentaerythritol phosphite prepared in Example 5.

*Example 12*

Example 7 was repeated replacing the $$[(C_6H_5O)_2POCH_2]_4C$$

by the same amount of the tripentaerythritol phosphite prepared in Example 6.

In place of the particular phosphites used in Examples 7–12, there can be employed any of the other pentaerythritol, dipentaerythritol or tripentaerythritol phosphites set forth above.

Unless otherwise stated all parts and proportions in the present specification and claims are by weight.

We claim:

1. A product selected from the group consisting of (a) $[(C_6H_4R-O)_2-P-O-CH_2]_4-C$ (b) [structure showing bis-phosphite of pentaerythritol with two aryl groups bearing R]

(c) [structure showing tetrakis-phosphite with four aryl groups bearing R]

where R is a member of the group consisting of hydrogen, alkyl, cyclohexyl, chloro and bromo; and (d) partial transesterification products of a member of the group consisting of dipentaerythritol and tripentaerythritol with a compound having the formula $$(C_6H_4R-O)_3P$$

where R is selected from the group consisting of hydrogen, alkyl, cyclohexyl, chloro and bromo, said partial transesterification product having the formula $C_{82}H_{76}O_{19}P_6$ when the member of the group is dipentaerythritol and having the formula $C_{111}H_{104}O_{26}P_8$ when the member of the group is tripentaerythritol and R is hydrogen and the corresponding analogs thereof when R is other than hydrogen.

2. $[(C_6H_5-O)_2-P-O-CH_2]_4C$

3. [structure: bis-phenoxy phosphite pentaerythritol diester]

4. [structure: tetrakis-phenoxy diphosphite pentaerythritol]

5. Trans-esterification product of 1 mol of dipentaerythritol with 6 mols of triphenyl phosphite having the formula $C_{82}H_{76}O_{19}P_6$.

6. Trans-esterification product of 1 mol of tripentaerythritol with 8 mols of triphenyl phosphite having the formula $C_{111}H_{104}O_{26}P_8$.

7. A process of preparing a mixed phosphite ester comprising condensing an ester having the formula $$(C_6H_4R-O)_3P$$

where R is selected from the group consisting of hydrogen, alkyl, cyclohexyl, chloro and bromo with an alcohol of the group consisting of pentaerythritol, dipentaerythritol and tripentaerythritol.

8. A process according to claim 7 wherein there are employed 2 to 8 mols of said ester for each mol of the alcohol.

References Cited in the file of this patent

UNITED STATES PATENTS

| | | |
|---|---|---|
| 2,175,509 | Rogers et al. | Oct. 10, 1939 |
| 2,241,244 | Conary et al. | May 6, 1941 |
| 2,530,353 | Havens | Nov. 14, 1950 |
| 2,572,571 | Marling | Oct. 23, 1951 |
| 2,686,170 | Best | Aug. 10, 1954 |

OTHER REFERENCES

Lucas et al.: J. Am. Chem. Soc. 72, 5491–5497 (1950).